United States Patent [19]
Harmsen

[11] Patent Number: 5,466,049
[45] Date of Patent: Nov. 14, 1995

[54] BALANCING RING

[76] Inventor: Arlyn Harmsen, Rte. 2, Box 462, Church Rd., Waupun, Wis. 53963-9802

[21] Appl. No.: 826,103

[22] Filed: Jan. 27, 1992

[51] Int. Cl.[6] .................................................. F16F 15/023
[52] U.S. Cl. .................................... 301/5.22; 74/573 F
[58] Field of Search ................................ 301/5 B, 5 BA; 74/573 R, 573 F

[56] References Cited

U.S. PATENT DOCUMENTS

| | | | |
|---|---|---|---|
| 1,314,005 | 8/1919 | Louden | 301/5 BA X |
| 2,687,918 | 8/1954 | Bell et al. | 74/573 F X |
| 3,077,914 | 2/1963 | Fritts | 301/5 BA X |
| 3,462,198 | 8/1969 | Onufer | 301/5 BA |
| 3,463,551 | 8/1969 | Clay | 301/5 BA |
| 4,674,356 | 6/1987 | Kilgore | 301/5 BA X |
| 5,073,217 | 12/1991 | Fogal | 301/5 BA X |

FOREIGN PATENT DOCUMENTS 0225744  9/1988  Japan .................. 74/573 F

Primary Examiner—Russell D. Stormer
Attorney, Agent, or Firm—Donald Cayen

[57] ABSTRACT

A balancing ring automatically balances an unbalanced rotating object without adding or removing weight to the object. The balancing ring comprises an airtight annular chamber that is partially filled with a high viscosity balancing material. The annular chamber is preferably created as an enclosed chamber by casting the object using the lost foam process. Alternately, the annular chamber may be a groove formed in the object and sealed with a cover, or it may comprise a tube formed into a circular hoop and fastened to the object. In any case, when the object is rotated, the balancing material redistributes itself inside the annular chamber in a manner that automatically compensates for the imbalance of the object. The balancing material can be introduced into the annular chamber at the manufacture of the balancing ring. Alternately, a port can be used to provide access to the annular chamber for enabling introduction of the balancing material subsequent to manufacture.

5 Claims, 2 Drawing Sheets

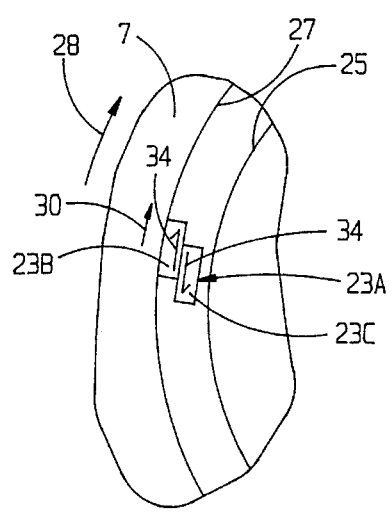
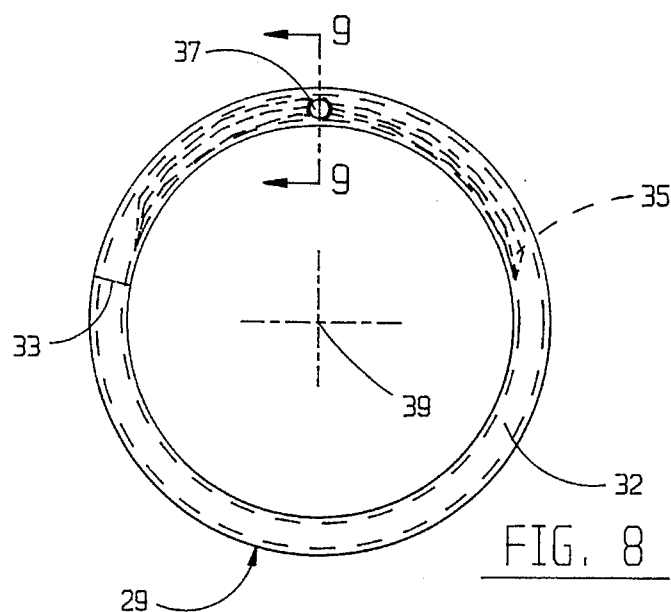
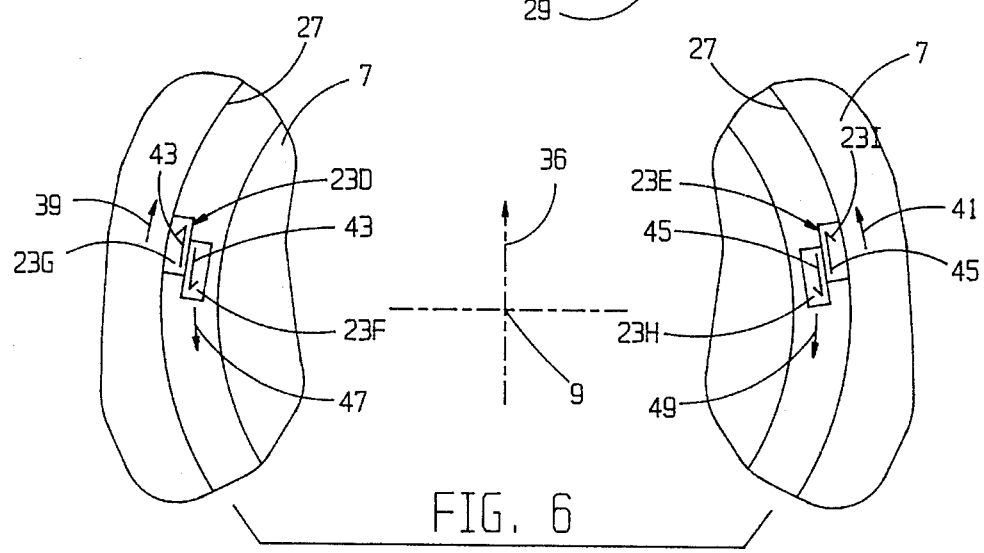
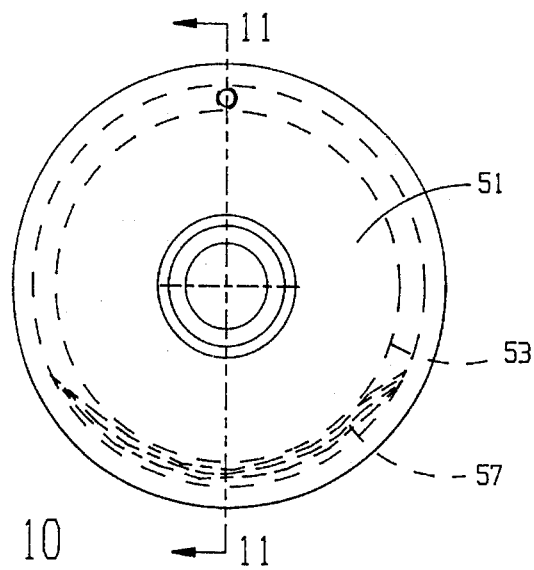
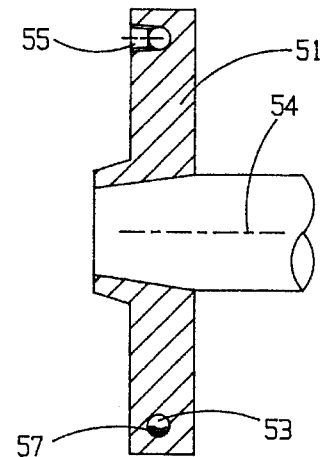

BALANCING RING

BACKGROUND OF THE INVENTION

1. Field of the Invention

This invention pertains to balancing rotating objects.

2. Description of the Prior Art

The detrimental effects of mechanical imbalances on rotating objects are well known. Accordingly, numerous types of equipment have been developed to assure that the mass of a rotating object is symmetrically distributed about its axis of rotation.

Rotating objects are invariably balanced by adding or subtracting mass at appropriate locations on the object. For example, it is known to add small weights to an object diametrically opposite the location of an eccentric center of mass. Alternately, holes may be drilled in radial alignment with and on the same side of the axis of rotation as an eccentric center of mass. Numerous balancing machines are in present use for performing the foregoing balancing procedures.

Although prior balancing machines are generally satisfactory for balancing rotating objects, they nevertheless have some disadvantages. For instance, they are generally expensive to design and manufacture. Proper operation of the machines requires skilled personnel. In addition, even with modern machines and skilled operators, valuable manufacturing time is necessary to perform the balancing process.

A very limited number of balancing applications involve punctured pneumatic vehicle tires. It is known to simultaneously seal a puncture and balance the repaired tire. That dual function is achieved by injecting a gel-like material into the tire through the valve stem. By rotating the tire at high speeds, the gel is thrown by centrifugal force around the inside periphery of the tire casing so that the gel fills the puncture hole. The gel simultaneously repairs the puncture and provides mass to balance the tires. However, balancing by means of the gel-like material has heretofore been limited to pneumatic tire applications.

SUMMARY OF THE INVENTION

In accordance with the present invention, a balancing ring is provided that is incorporated into a rotating object to automatically balance the object. This is accomplished by apparatus that includes a sealed annular chamber that is partially filled with a balancing material.

The annular chamber of the balancing ring may be of any size to suit the particular object to be balanced. The annular chamber may be a separate component that is fastened to the object. Alternately, the annular chamber may be formed directly into the object. The longitudinal axis of the annular chamber is generally concentric with the axis of rotation of the object.

The balancing material is preferably a very viscous liquid such as a paste or gel. Best results are obtained when the annular chamber is filled approximately half full with the balancing material. The location of the balancing material inside the annular chamber upon initial filling is not important.

At startup, the balancing ring rotates together with the unbalanced object about a common axis. Centrifugal force throws the balancing material outwardly against the inside peripheral surface of the outer wall of the annular chamber. The initial unbalanced condition of the object sets up vibrations such that the instantaneous axis of rotation of the object and the balancing ring moves in space generally cyclically about a nominal or average location of the axis of rotation. The cyclical movements of the object give rise to corresponding acceleration forces on the balancing ring. The direction of the acceleration force at any instant is in the instantaneous radial direction from the axis of rotation to the eccentric center of mass of the object. The accelerations produce frictional forces between the annular chamber peripheral outer wall and the balancing material therein. The accelrations also produce shear forces between adjacent portions of the balancing material itself. Because of the inertia and relatively low shear strength of the balancing material, the accelerations and resulting forces result in the balancing material flowing and redistributing itself inside the annular chamber. The balancing material flows in a direction opposite the instantaneous direction of motion of the object caused by the imbalanced condition. Consequently, the balancing material flows to compensate for the out-of-balance condition of the object. Normally it takes only a few seconds and a few dozen rotations for a properly designed balancing ring to automatically balance the object and bring about smooth rotation thereof. Automatic balancing occurs regardless of the initial location of the balancing material inside the annular chamber and regardless of any imbalance of the balancing ring itself about the axis of rotation of the object.

Other advantages, benefits, and features of the invention will become apparent to those skilled in the art upon reading the detailed disclosure of the invention.

BRIEF DESCRIPTION OF THE DRAWINGS

FIG. 5 is a partial enlarged schematic view of a representative portion of a balancing ring according to the present invention undergoing steady state rotation.

FIG. 6 is a view similar to FIG. 5 but showing the balancing ring undergoing cyclical vibratory motions.

FIG. 8 is a top view of a modified embodiment of the present invention.

FIG. 10 is a front view of a further modified embodiment of the invention.

FIG. 11 is a cross sectional view taken along lines 11—11 of FIG. 10.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
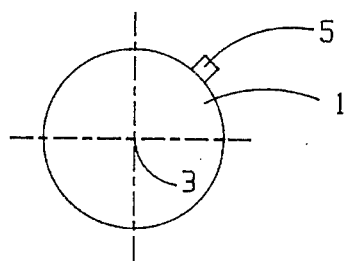
FIG. 1 is a schematic view of a typical unbalanced object at rest.

Referring to FIG. 1, a typical object 1 is illustrated that rotates about an axis 3. The object 1 can represent any of numerous rotatable bodies such as fans, pulleys, small internal combustion engines, outboard motors, propellers, flywheels, and the races of anti-friction bearings. The manufacturing processes for such objects almost inherently result in the objects being non-symmetrical about their respective axes of rotation. For convenience, the non-symmetrical mass distribution of the object 1 will be represented by a weight 5 added to the object at an arbitrary angular and radial location.

Figure 2:
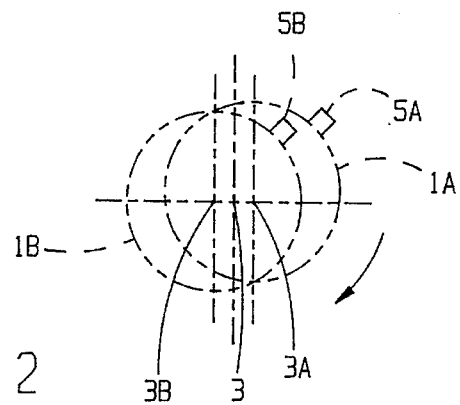
FIG. 2 is a schematic view of the object of FIG. 1 undergoing vibrations during rotation thereof.

In FIG. 2, it is assumed that the object rotates in the direction of arrow 7 about the axis of rotation 3. When the unbalanced object is rotated, vibrations are created. As a result, the instantaneous axis of rotation becomes displaced from and continuously moves relative to the nominal or average axis of rotation 3. Reference numeral 1A represents a random instantaneous position of the object in space and having a first instantaneous axis of rotation 3A. Reference numeral 1B represents a random instantaneous position of the object in space at a second instant and having a second instantaneous axis of rotation 3B.

Figure 3:
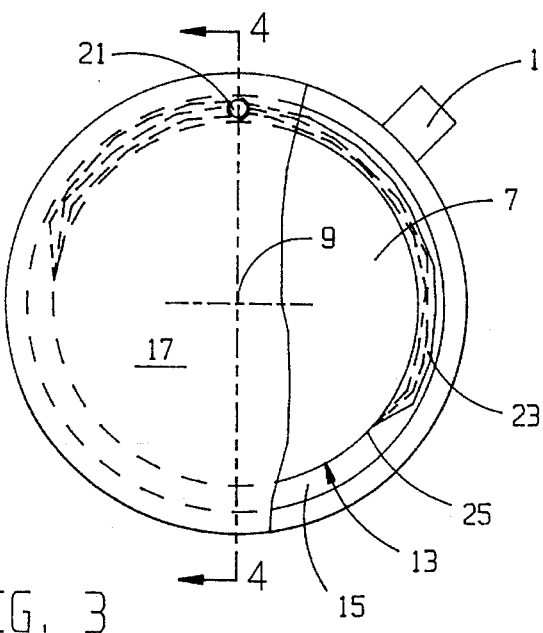
FIG. 3 is a partially broken top view of an unbalanced object at rest that includes the balancing ring of the present invention.
Figure 4:
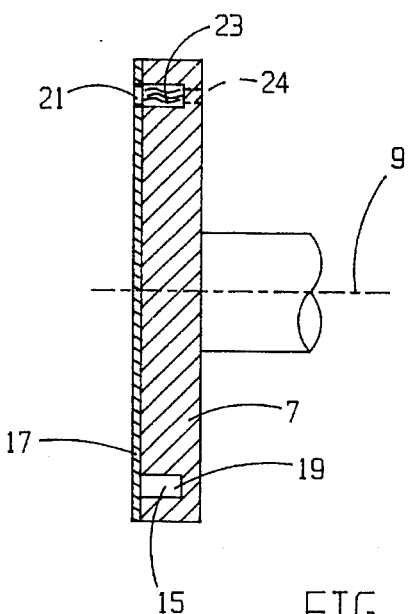
FIG. 4 is a longitudinal cross sectional view of FIG. 3.

In accordance with the present invention, a balancing ring is incorporated into an unbalanced object, such as object 1, that automatically compensates for the unbalanced condition when the object is rotated. Turning to FIGS. 3 and 4, a typical rotatable object 7 is shown, together with its nominal axis of rotation 9. The object 7 is unbalanced about the axis of rotation 9 by an amount represented by weight 11. The balancing ring is represented at reference numeral 13. The balancing ring 13 comprises an annular groove 15 machined or otherwise formed in the object 7 generally concentric with the axis of rotation 9. A cover 17 seals the groove 15 such that the object and cover cooperate to form an annular chamber 19. It is preferred that an opening be formed in the cover 17 in alignment with the groove 15 and that a plug 21 be removably inserted into the cover opening. The opening and plug 21 may be located at any angular location around the groove 15. In that manner, the groove is accessible without having to remove the cover. It is necessary that the cover and plug provide airtight fits to the annular chamber 19.

The balancing ring 13 further comprises a quantity of a semi-liquid balancing material 23. A satisfactory material is a puncture sealant material manufactured by PJI Corporation of Scottsdale, Ariz., and marketed under the trademark Flat Shield. The balancing material 23 may be introduced into the groove 15 at manufacture of the object 7 and before the cover 17 is applied. Alternately, the balancing material can be introduced into the annular chamber 19 through the cover opening after final assembly of the cover to the object.

Depending upon the design of the object, it may be more convenient to provide access to the annular chamber 19 through a closable passage in the object itself, as is indicated by phantom lines 24 in FIG. 4, rather than through the cover 17. In that situation, at least a portion of the object material removed to create the passage 24 will be replaced by a plug or other closure, not shown. If the passage length or diameter is exceptionally large, however, it may be desirable to insert a pin made of the object material to compensate for the weight of the material removed. It is expected that most applications of the present invention will not require a compensating pin.

In any case, the balancing material can be initially located inside the annular chamber 19 at any random angular location relative to the point of object imbalance represented by the weight 11, FIG. 3. The balancing material may also assume any initial configuration inside the annular chamber; for clarity I have depicted the balancing material as being distributed in a relatively thin layer lying primarily along the inner peripheral surface 25 of the annular chamber groove 15. I have found that best results are obtained when the annular chamber is approximately one-half full of balancing material. For clarity, however, a lesser amount is shown in the drawings.

FIGS. 5 and 6 show the operation of a balancing ring 13 on the object 7. When the object is initially rotated about its axis of rotation 9, the balancing material 23 is flung by centrifugal force against the outer peripheral surface 27 of the annular chamber groove 15. When the balancing material strikes the outer surface 27, that surface tends to drag the material with it and in the same direction due to the friction force between the material and the surface, and due to the shear strength between adjacent layers of the material itself. That situation is illustrated in FIG. 5, in which the object 7 is shown rotating at a constant speed in the direction of arrow 28. A representative portion 23A of the balancing material is shown in contact with the surface 27. The friction force acting on the adjacent layer 23B of the balancing material portion 23A is represented by arrow 30. The friction force 30 tends to pull the adjacent layer 23B of the portion 23A in the same direction as arrow 30. At the same time, the friction force 30 is transferred to a second layer 23C of the material portion 23A by means of shear forces represented by arrows 34. Because of the inertia and relatively low shear strength of the balancing material, the balancing material tends to slide and flow relative to itself and relative to the peripheral surface 27 of the annular chamber 19. The sliding of the balancing material is in the direction opposite the direction of rotation 28 of the object 7. The result of the friction force 30 and shear forces 34 is to cause the balancing material to redistribute itself around the surface 27. Since the rotational speed of the object is usually constant, the balancing material ultimately tends to form into a generally smooth layer around the surface 27.

Figure 7:
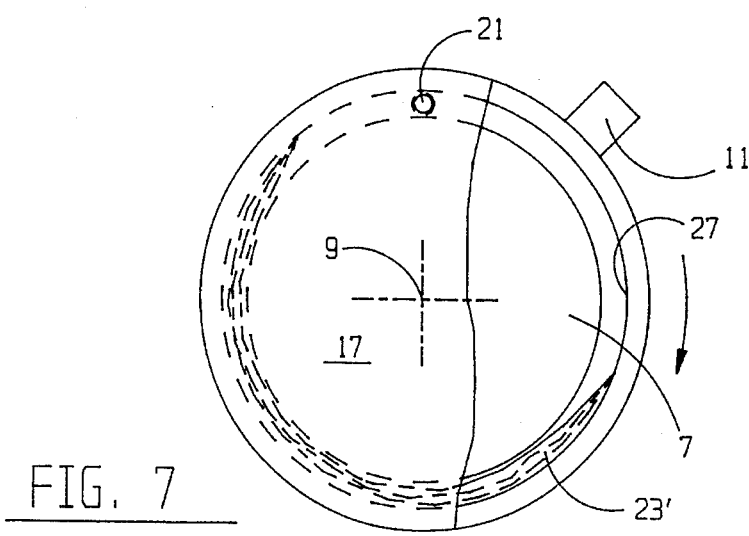
FIG. 7 is a view similar to FIG. 3 but showing the operation of the balancing ring to balance the unbalanced condition of the object.

However, simultaneously with the steady state redistribution of the balancing material 23 around the peripheral surface 27 of the annular chamber groove 15, the balancing material undergoes additional stresses because of the vibrations induced on the object 7 by the mechanical imbalance 11. In the normal situation, the forces that restrain the object from moving in strict response to the vibratory forces are greater in some radial directions relative to the axis of rotation 9 than in other radial directions. Looking at FIG. 6, two representative sections of the object 7 are shown in which the object is instantaneously relatively free to move in the direction of arrow 36 but is relatively restrained from moving in the directions perpendicular thereto. The instantaneous motion of the object in the direction of arrow 36 gives rise to two unbalanced forces on the representative portions 23D and 23E of balancing material. The first force on the balancing material portions 23D and 23E are friction forces 39 and 41, respectively, in the direction of arrow 36. The friction forces 39 and 41 tend to drag the balancing material portions 23D and 23E in the direction of arrow 36. In addition, as discussed previously in connection with the balancing material portion 23A of FIG. 5, shear stresses 43 and 45 are induced in the balancing material portions 23D and 23E, respectively, by the acceleration of the object 7. The shear stress 43 causes layer 23F of the representative balancing material portion 23D to slide relative to the adjacent balancing material layer 23G. The shear stress 45 causes the balancing material layer 23H to slide relative to the adjacent layer 23I. The direction of sliding of the layers 23G and 23I relative to the surface 27 is in the direction opposite arrow 36. Similarly, the direction of sliding of the layers 23F and 23H relative to the adjacent layers 23G and 23I, respectively, is in the direction opposite arrow 36. It is thus seen that the balancing material slides tangentially in the direction opposite the instantaneous direction of vibration-induced motion. Since the direction of instantaneous vibration-induced motion is in the same instantaneous direction as the imbalance 11 on the object relative to the axis of rotation 9, the balancing material 23 as a whole slides and flows in tangential motions away from the imbalance 11. The process is repeated continuously throughout the balancing material. As a result, the balancing material gradually redistributes itself within the annular chamber to a location generally diametrically opposite the imbalance 11. As rotation continues, the balancing material redistributes on a diminishing basis. That is because each shift of the balancing material reduces the total amount of imbalance of the object, balancing ring, and imbalance 11. Within a few seconds and a few dozen revolutions of operation, the balancing material is redistributed sufficiently to compensate for the imbalance 11. That is, the object 7 is balanced. The balancing material 23 does not form as a lump or mound in the annular chamber 19 opposite the weight 11. Rather, the balancing material forms as a relatively long thin crescent 23' with its point of maximum thickness lying diametrically opposite the imbalance 11, as is shown in FIG. 7. Although I am not certain of exactly how my invention works, I believe that the foregoing is a reasonable explanation of how the balancing ring 13 quickly and automatically compensates for the initial imbalance of an object without any intervention by a person.

During periods when the object 7 is not rotated, the balancing material 23 may redistribute itself inside the annular chamber 19 due to gravity or other reasons. That situation presents no problem. Upon restarting the object to rotate, the balancing material 23 quickly reassumes its compensating distribution inside the annular chamber 19 by sliding and flowing to the crescent configuration 23' in FIG. 7.

If desired, a hardening agent can be added to the balancing material 23 inside the annular chamber 19. For example, a rather fast acting epoxy can be inserted into the annular chamber along with the balancing material. The object 1 is rotated immediately after the balancing material and hardening agent are inserted. The balancing material, along with the hardening agent, redistributes within the annular chamber in the previously described manner. With the balancing material and hardening agent in the proper place for correcting the object imbalance, the hardening agent sets to permanently maintain the two materials in that proper location. The object imbalance is thus compensated on a permanent basis the first time the object is rotated, and no rebalancing action occurs upon subsequent startups.

Figure 9:
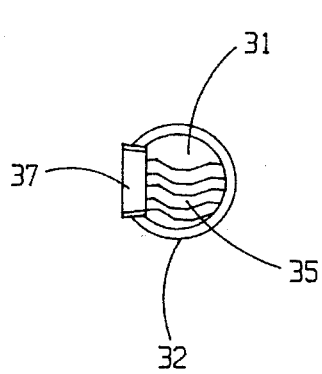
FIG. 9 is a cross sectional view taken along lines 9—9 of FIG. 8.

In a modified embodiment of the present invention shown in FIGS. 8 and 9, a balancing ring 29 is in the form of an annular chamber 31 that is separate and independent from any object with which it is to be used. The balancing ring 29 shown in FIGS. 8 and 9 has an annular chamber 31 that is made of a tube 32. The tube 32 is formed into a closed circular hoop. The balancing material 35 of the balancing ring 29 may be injected into the tube 32 before the ends 33 thereof are joined together. Alternately, a removable plug 37 may be used in conjunction with the tube to enable the balancing material 35 to be introduced into the annular chamber 31 at any time after the tube ends 33 are joined together.

The balancing ring 29 may be manufactured in any size to suit the particular object with which it is to be used. The balancing ring 29 is fastened to the object in any appropriate manner, such as with clamps. If desired, the balancing ring 29 can be placed in a groove fabricated for that purpose in the object. In addition to the outstanding advantage of automatically balancing the object with which it is used, the balancing ring 29 possesses the further advantage of not having to be itself balanced about a central axis 39. When the balancing ring 29 is assembled to the object, the balancing material 35 automatically takes into account any imbalance of the balancing ring and balances that imbalance, too. The result is a very economical component for efficiently and automatically balancing rotating objects.

Turning to FIGS. 10 and 11, a further modified construction for the present invention is depicted. An unbalanced object typically represented at reference numeral 51 is manufactured with a cast annular chamber 53. The annular chamber 53 is concentric with the object axis of rotation 54. The annular chamber 53 may be created in the object 51 by means of the lost foam process. As is known in the art, a ring of tyrofoam or similar low density volatile foam material is constructed as a part of the object pattern. Upon casting the object, the foam evaporates to leave the totally enclosed annular chamber 53. Later, a hole is drilled and tapped into the object to provide access to the annular chamber. The hole is closeable with a plug 55. Upon adding the balancing material, shown at representative location 57, and the optional hardening agent, the annular chamber is sealed with the plug 55. Upon setting the object 51 to rotating about the axis 54, the balancing material 57 automatically compensates for the imbalance of the object.

As an example of a balancing ring according to the present invention, a flywheel was balanced using the balancing ring 13 described previously. The flywheel had an outer diameter of seven inches, a thickness of 0.75 inches, and a weight of 15.5 ounces. The flywheel had an imbalance condition of 0.88 ounce-inches. The flywheel was attached to a small motor and rotated at 800 revolutions per minute. During rotation, the vibrations of the flywheel and attached motor were so great that a person had great difficulty holding the motor and flywheel. A groove 0.25 inches deep and 0.50 inches wide was machined into the flywheel with the circumferential centerline of the groove at a radial distance of 2.63 inches from the flywheel longitudinal axis. Two ounces of AJI sealant material was introduced at a random location into the groove. The groove was sealed with a cover. At startup, the flywheel and motor vibrated violently. However, after approximately five seconds, the vibrations ceased, and the motor and flywheel rotated continuously thereafter with no further vibrations.

Thus, it is apparent that there has been provided, in accordance with the invention, a balancing ring that fully satisfy the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A balancing ring for balancing an imbalanced object that is rotatable about an axis of rotation comprising:

a. an annular chamber formed in the object generally concentric with the axis of rotation thereof;

b. a predetermined amount of a selected gel material placed in the annular chamber, the material automatically distributing itself within the annular chamber to a location that balances the object when the object is rotated; and c. hardener means for permanently maintaining the gel material at the location that balances the object.

2. A method of balancing an unbalanced object that rotates about an axis of rotation comprising the steps of:

a. forming an annular chamber in the object generally concentric with the axis of rotation;

b. introducing a predetermined quantity of a selected gel balancing material into the annular chamber;

c. introducing a predetermined quantity of a hardening agent with the balancing material into the annular chamber;

d. rotating the object and redistributing the balancing material within the annular chamber to compensate the imbalance of the object; and e. setting the hardening agent to permanently maintain the redistributed balancing material within the annular chamber of the compensated object.

3. A balancing ring for balancing an imbalanced object that is rotatable about an axis of rotation comprising:

a. an annular chamber formed in the object generally concentric with the axis of rotation thereof; and b. a predetermined amount of a selected gel material placed in the annular chamber, the chamber being empty except for the gel material therein, the material automatically distributing itself within the annular chamber to a location that balances the object when the object is rotated.

4. Balanced apparatus rotating about an axis of rotation comprising:

a. an object that is imbalanced rotationally about the axis of rotation, the object defining a generally circular airtight annular chamber generally concentric with the axis of rotation;

b. balancing means introduced into the annular chamber for automatically distributing itself within the annular chamber when the object is rotated to compensate for the imbalance of the object; and c. hardener means introduced into the annular chamber for permanently maintaining the distributed balancing means at a location within the annular chamber that compensates for the imbalance of the object, so that the object and the balancing means rotate together in a balanced condition.

5. A method of balancing an unbalanced object that rotates about an axis of rotation comprising the steps of:

a. forming an annular chamber in the object generally concentric with the axis of rotation;

b. introducing a predetermined quantity of only a selected gel balancing material into the annular chamber; and c. rotating the object and redistributing the balancing material within the annular chamber to compensate the imbalance of the object.

* * * * *